US012419797B2

(12) United States Patent
Xie

(10) Patent No.: US 12,419,797 B2
(45) Date of Patent: Sep. 23, 2025

(54) SEMI-RECUMBENT ADJUSTABLE NURSING BED WITH LARGE-ANGLE LATERAL TILT

(71) Applicant: Hopefull Medical Equipment Co., Ltd., Xianning (CN)

(72) Inventor: Jianfeng Xie, Xianning (CN)

(73) Assignee: Hopefull Medical Equipment Co., Ltd., Xianning (CN)

( * ) Notice: Subject to any disclaimer, the term of this patent is extended or adjusted under 35 U.S.C. 154(b) by 0 days.

(21) Appl. No.: 19/080,278

(22) Filed: Mar. 14, 2025

(65) Prior Publication Data

US 2025/0241810 A1 Jul. 31, 2025

Related U.S. Application Data

(63) Continuation of application No. PCT/CN2023/126426, filed on Oct. 25, 2023.

(30) Foreign Application Priority Data

Feb. 8, 2023 (CN) ......................... 202310116046.9

(51) Int. Cl.
*A61G 7/015* (2006.01)
*A61G 7/008* (2006.01)
*A61G 7/018* (2006.01)

(52) U.S. Cl.
CPC ............. *A61G 7/015* (2013.01); *A61G 7/008* (2013.01); *A61G 7/018* (2013.01)

(58) Field of Classification Search
CPC ................................ A61G 13/04; A61G 7/008
USPC ............................................................. 5/608
See application file for complete search history.

(56) References Cited

U.S. PATENT DOCUMENTS

| | | | | |
|---|---|---|---|---|
| 1,740,906 A * | 12/1929 | Rothauszky | ......... | A47C 20/041 601/24 |
| 5,125,122 A * | 6/1992 | Chen | ...................... | A61G 7/015 5/942 |
| 5,303,437 A * | 4/1994 | Hung | ..................... | A61G 7/015 5/942 |
| 7,246,389 B2 * | 7/2007 | Taguchi | ................. | A61G 7/015 5/942 |
| 7,712,168 B2 * | 5/2010 | Kim | ....................... | A61G 7/053 5/942 |
| 10,463,160 B2 * | 11/2019 | Tsai | ..................... | A47C 19/005 |
| 2005/0160530 A1 * | 7/2005 | Taguchi | ................. | A61G 7/001 5/613 |

(Continued)

FOREIGN PATENT DOCUMENTS

| | | | | |
|---|---|---|---|---|
| CN | 109363852 A | * 2/2019 | ............. | A61G 7/001 |
| CN | 209678915 U | * 11/2019 | ............. | A61G 7/001 |

(Continued)

*Primary Examiner* — Eric J Kurilla
(74) *Attorney, Agent, or Firm* — Nitin Kaushik

(57) ABSTRACT

Disclosed is a semi-recumbent position adjustable nursing bed with a large lateral tilting angle, including a bed frame, a back support and a leg support, the back support and the leg support being arranged on the bed frame, a back side-tilt for lateral tilting of the back support being arranged on the bed frame, and a leg side-tilt for lateral tilting of the leg support being further arranged on the bed frame, and further including a leveling adjuster arranged between the bed frame and the leg side-tilt, which enables the leg side-tilt to move in a horizontal direction relative to the bed frame.

7 Claims, 17 Drawing Sheets

(56) References Cited

U.S. PATENT DOCUMENTS

| | | | | |
|---|---|---|---|---|
| 2005/0166323 | A1* | 8/2005 | Kawakami | A61G 7/015 5/613 |
| 2006/0085913 | A1* | 4/2006 | Kawakami | A47C 20/041 5/624 |
| 2009/0094744 | A1* | 4/2009 | Benzo | A61G 7/015 5/608 |

FOREIGN PATENT DOCUMENTS

| | | | |
|---|---|---|---|
| CN | 111568664 | A | 8/2020 |
| CN | 113143632 | A | 7/2021 |
| CN | 113975026 | A | 1/2022 |

* cited by examiner

SEMI-RECUMBENT ADJUSTABLE NURSING BED WITH LARGE-ANGLE LATERAL TILT

CROSS-REFERENCE TO RELATED APPLICATIONS

The application claims priority to Chinese patent application No. 2023101160469, filed on Feb. 8, 2023, the entire contents of which are incorporated herein by reference.

TECHNICAL FIELD

The present invention relates to the technical field of nursing beds, and in particular to a semi-recumbent position adjustable nursing bed with a large lateral tilting angle.

BACKGROUND

As is known, nursing beds can alleviate the workload of doctors and nursing staff, and allow bedridden patients to receive more comfortable treatment and enjoy the recovery process. Currently, there are many types of medical beds on the market with bed boards that can lateral tilt, but the lateral tilting angle is small, and the back board and leg board can only lateral tilt integrally, failing to meet the need for separate lateral tilting and significantly increasing the workload of doctors and nursing staff. Therefore, the ordinary lateral tilting function of existing medical beds on the market can no longer meet actual nursing needs.

For example, the authorized invention patent with publication No. CN113143632B, and publication date of Aug. 26, 2022 discloses a nursing bed with a lateral tilting function, which comprises a bed frame, where a back board, a hip board, a thigh board and a calf plate are sequentially covered on the bed frame, and each of a structure that a left half and a right half are rotatably connected. A back lifting assembly is arranged below the back board, which can drive the back board to move upward to be disengaged from the hip board. A first connecting lug is arranged on the back board, a second connecting lug is arranged on the hip board, the first connecting lug and the second connecting lug are rotatably connected through a first bolt. A first opening is arranged on the second connecting lug, and the first bolt is separated from the first opening when the back board moves upward. A turning mechanism connected with the hip board is arranged below the back board. When the back board, the hip board, the thigh board and the calf plate are located on a same plane, the turning mechanism acts on the hip board to drive the left half or the right half of the back board, the hip board, the thigh board and the calf plate to turn synchronously. This invention solves the problem of synchronous lateral tilting of the various bed boards of the nursing bed where the back board and the hip board can be separated from each other.

The defects of the prior art are that for lateral tilting of the bed boards in sections, two power sources for movement mechanisms are arranged and correspond to lateral tilting of the back and legs of a patient respectively, and therefore, after long-term use, the back portion and the leg portion of the nursing bed are uneven due to accumulation of various errors.

SUMMARY

The objective of the present invention is to provide a semi-recumbent position adjustable nursing bed with a large lateral tilting angle, which solves the technical problems in related technology.

To achieve the above objective, the present invention provides a technical solution as follows:

A semi-recumbent position adjustable nursing bed with a large lateral tilting angle includes a bed frame, a back support and a leg support, the back support and the leg support being arranged on the bed frame, a back side-tilt for lateral tilting of the back support being arranged on the bed frame, and a leg side-tilt for lateral tilting of the leg support being further arranged on the bed frame, and further includes a leveling adjuster arranged between the bed frame and the leg side-tilt, which enables the leg side-tilt to move in a horizontal direction relative to the bed frame.

A part of the back support portion near the leg support portion in a length direction of the bed frame is hinged to the bed frame, and a back turning component is arranged between the bed frame and the back support.

During a turning stroke of the back support driven by the back turning component, the back side-tilt can also drive the back support to lateral tilt, and the leg side-tilt can also drive the leg support to lateral tilt.

The back support includes a left back portion, a right back portion and a middle back portion in a width direction of the bed frame, the middle back portion connecting the left back portion and the right back portion, and the back side-tilt acts on the middle back portion.

The leg support includes a left leg portion, a right leg portion and a middle leg portion in the width direction of the bed frame, the middle leg portion connecting the left leg portion and the right leg portion, the leg side-tilt acts on the middle leg portion, the left back portion corresponds to the left leg portion, the right back portion corresponds to the right leg portion, and the middle back portion corresponds to the middle leg portion.

The leg side-tilt includes a lateral tilting motor, an output end of the lateral tilting motor is connected to a left side of the bed frame through the leveling adjuster, an opposite end of the lateral tilting motor is hinged to a first swing arm, and one end of the first swing arm is hinged to a right side of the bed frame through a first supporting block:

A second swing arm is fixedly connected to the first swing arm, one end of the second swing arm is hinged to a right side of the middle leg portion through a first connecting rod, a second supporting block is fixedly connected to a middle portion of the bed frame, and an upper end of the second supporting block is hinged to a middle position of the middle leg portion:

A left end of the middle leg portion is hinged to a third swing arm, a right side of the left leg portion is hinged to the third swing arm, and the third swing arm is hinged to the second supporting block through a second connecting rod:

A right end of the middle leg portion is hinged to a fourth swing arm, a left side of the right leg portion is hinged to the fourth swing arm, and the fourth swing arm is hinged to the second supporting block through a third connecting rod.

The leveling adjuster includes a bolt connection pair screwed to the left side of the bed frame, the output end of the lateral tilting motor is hinged to a lifting lug, and the bolt connection pair rotates to enable the lifting lug to move in a horizontal direction relative to the bed frame.

A buffer is hinged between the lifting lug and the first swing arm.

A first supporting surface is arranged on the third swing arm, and the left leg portion is kept in a horizontal state by the first supporting surface during a lateral tilting stroke of the middle leg portion.

A second supporting surface is arranged on the fourth swing arm, and the right leg portion is kept in a horizontal state by the second supporting surface during the lateral tilting stroke of the middle leg portion.

The present invention has the beneficial effects that by arranging the leveling adjuster, when the back portion and the leg portion of the nursing bed are not flat, the leg side-tilt can be adjusted to move horizontally, the leg side-tilt drives the leg support to synchronously move, the position change, i.e., the change of the surface gradient, of the leg support can be made according to the surface gradient of the back support, so that the back portion and the leg portion of the nursing bed can be at a same gradient.

BRIEF DESCRIPTION OF THE DRAWINGS

To describe the technical solutions in the embodiments of the present application or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings.

Figure 1:
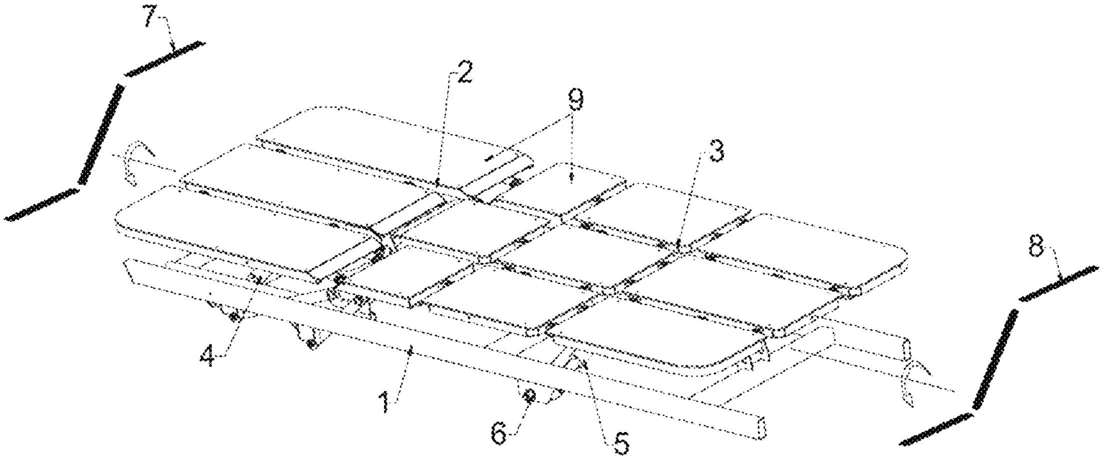
FIG. 1 is a schematic structural perspective view of a semi-recumbent position adjustable nursing bed with a large lateral tilting angle according to an embodiment of the present invention.

Reference numerals in the accompanying drawings:

1. bed frame; 2. back support; 20. left back portion; 21. right back portion; 22. middle back portion; 3. leg support; 30. left leg portion; 31. right leg portion; 32. middle leg portion; 320. toothed block; 321. counterweight; 322. elastic rope; 323. tilting board; 324. limiting groove; 325. first gear; 326. second gear; 327. third gear; 328. fourth gear; 329. third supporting block; 330. fourth supporting block; 331. fifth supporting block; 332. first non-elastic rope; 333. second non-elastic rope; 334. sixth supporting block; 335. seventh supporting block; 336. fourth connecting rod; 337. locking hole; 338. locking rod; 339. first gear rack; 340. trigger block; 341. second gear rack; 342. fifth gear; 343. notch; 344. hinge shaft; 345. strip groove; 4. back side-tilt; 5. leg side-tilt; 50. lateral tilting motor; 51. first swing arm; 52. first supporting block; 53. second swing arm; 54. first connecting rod; 55. second supporting block; 56. third swing arm; 560. first supporting surface; 57. second connecting rod; 58. fourth swing arm; 580. second supporting surface; 59. third connecting rod; 6. leveling adjuster; 60. bolt connection pair; 61. lifting lug; 62. buffer; 7. schematic representation of lateral tilting of back support; 8. schematic representation of lateral tilting of leg support; 9. bed board.

DETAILED DESCRIPTION OF THE EMBODIMENTS

In order to provide a better understanding of the technical solution of the present invention for those skilled in the art, the present invention will be described below in detail with reference to the accompanying drawings.

Figure 2:
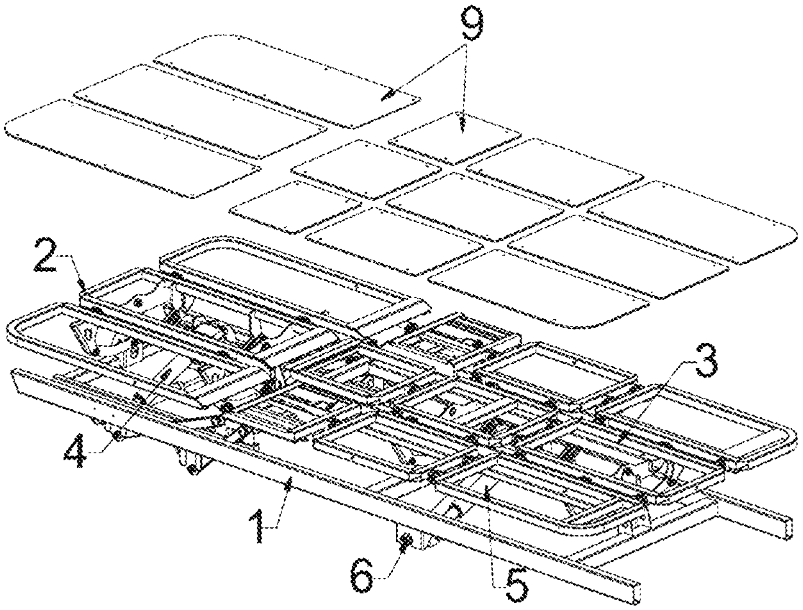
FIG. 2 is a schematic structural perspective view of the semi-recumbent position adjustable nursing bed with a large lateral tilting angle with a bed frame and bed boards separated according to the embodiment of the present invention.
Figure 3:
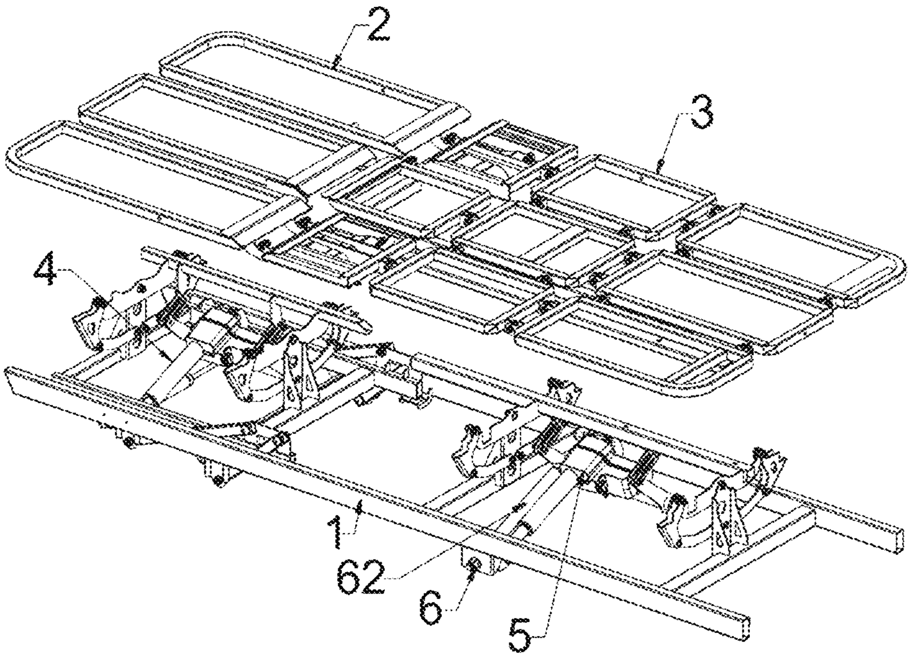
FIG. 3 is a schematic structural perspective view of the semi-recumbent position adjustable nursing bed with a large lateral tilting angle with the bed frame, a back support and a leg support separated according to the embodiment of the present invention.
Figure 4:
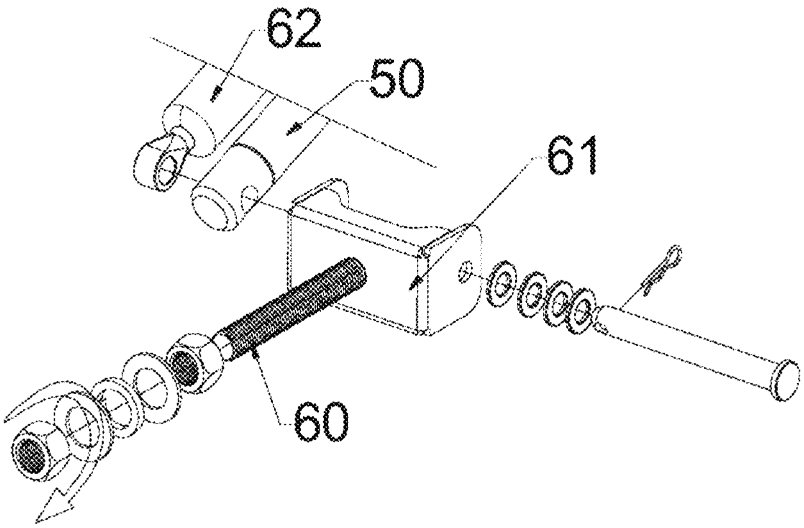
FIG. 4 is a schematic structural perspective view of a leveling adjuster of the semi-recumbent position adjustable nursing bed with a large lateral tilting angle according to the embodiment of the present invention.
Figure 5:
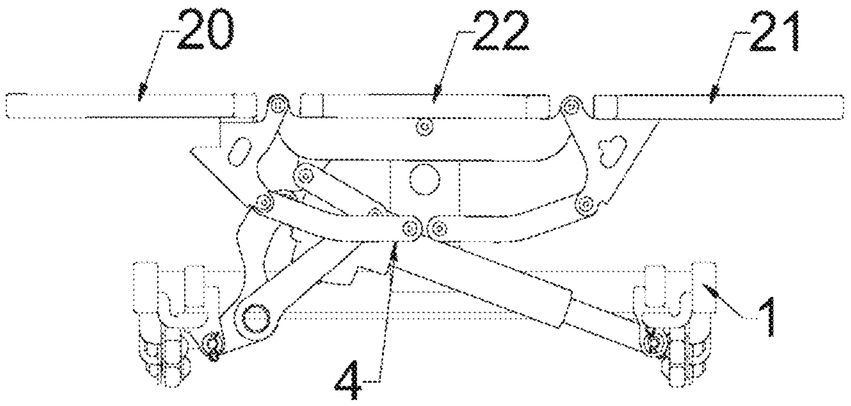
FIG. 5 is a simplified schematic view of a back side-tilt in a horizontal state of the semi-recumbent position adjustable nursing bed with a large lateral tilting angle according to the embodiment of the present invention.
Figure 6:
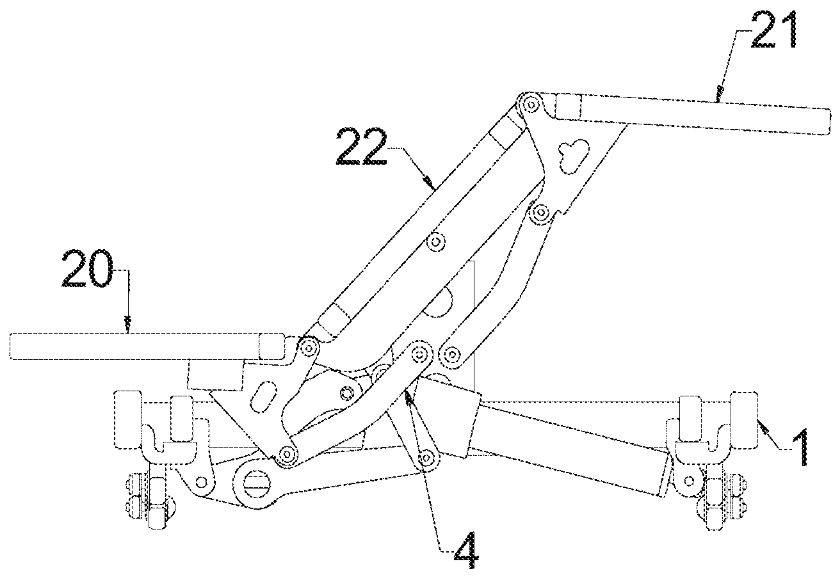
FIG. 6 is a simplified schematic view of the back side-tilt in a left tilting state of the semi-recumbent position adjustable nursing bed with a large lateral tilting angle according to the embodiment of the present invention.
Figure 7:
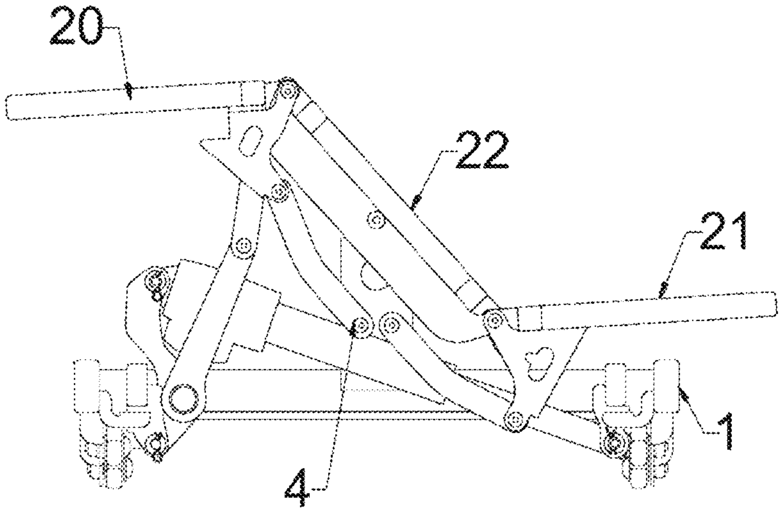
FIG. 7 is a simplified schematic view of the back side-tilt in a right tilting state of the semi-recumbent position adjustable nursing bed with a large lateral tilting angle according to the embodiment of the present invention.
Figure 8:
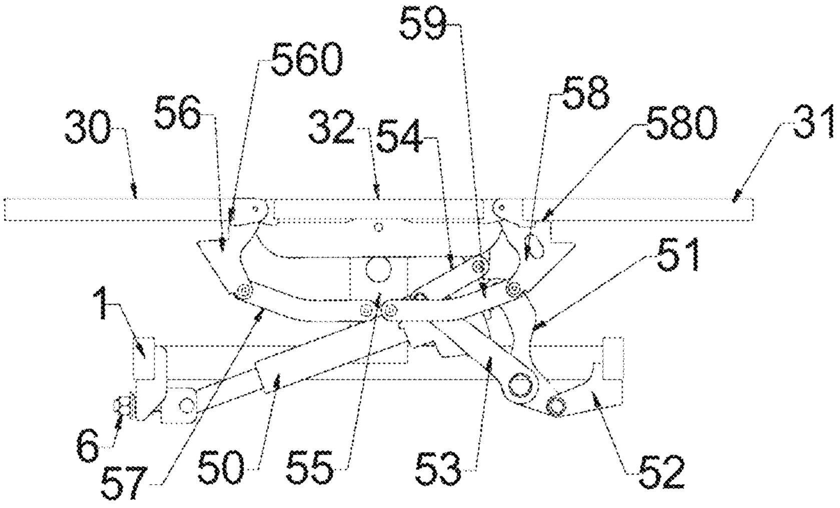
FIG. 8 is a simplified schematic view of a leg side-tilt in a horizontal state of the semi-recumbent position adjustable nursing bed with a large lateral tilting angle according to the embodiment of the present invention.
Figure 9:
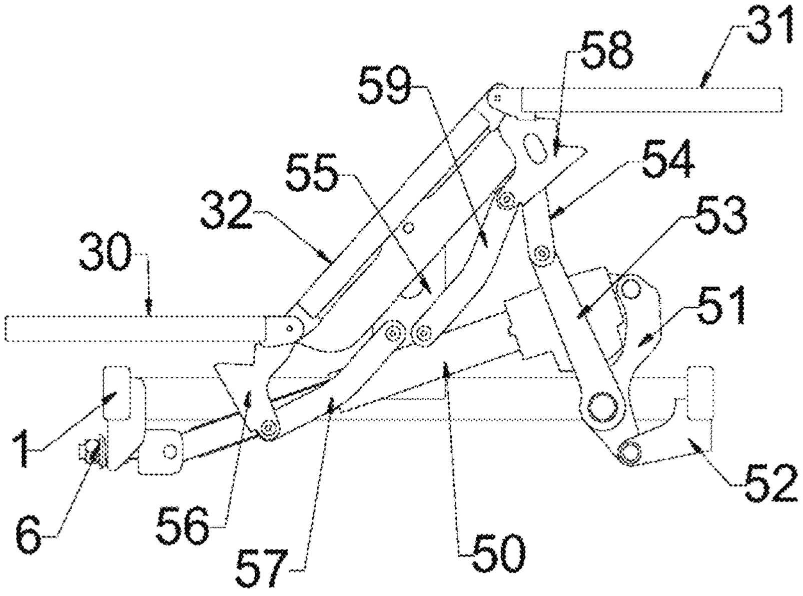
FIG. 9 is a simplified schematic view of the leg side-tilt in a left tilting state of the semi-recumbent position adjustable nursing bed with a large lateral tilting angle according to the embodiment of the present invention.
Figure 10:
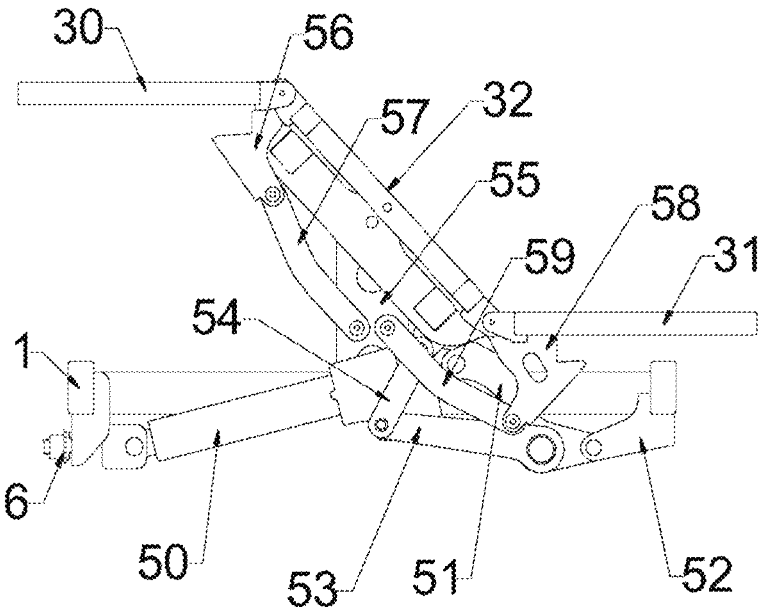
FIG. 10 is a simplified schematic view of the leg side-tilt in a right tilting state of the semi-recumbent position adjustable nursing bed with a large lateral tilting angle according to the embodiment of the present invention.

As shown in FIGS. 1-10, in one embodiment of the present invention, a semi-recumbent position adjustable nursing bed with a large lateral tilting angle includes a bed frame 1, a back support 2 and a leg support 3, the back support and the leg support being arranged on the bed frame, a back side-tilt 4 for lateral tilting of the back support 2 being arranged on the bed frame 1, and a leg side-tilt 5 for lateral tilting of the leg support 3 being further arranged on the bed frame 1, and further includes a leveling adjuster 6 arranged between the bed frame 1 and the leg side-tilt 5, which enables the leg side-tilt 5 to move in a horizontal direction relative to the bed frame 1.

Specifically, the back support 2 mainly supports the head, back and waist of a patient and the leg support 3 mainly supports the hip, legs and feet. The back side-tilt 4 provides lateral tilting power and supporting force during lateral tilting of the back support 2 so as to ensure stable lateral tilting process of the back support 2, and the leg side-tilt 5 provides lateral tilting power and supporting force during lateral tilting of the leg support 3 so as to ensure stable lateral tilting process of the leg support 3, avoiding secondary injury to the patient. The back support 2 and the leg support 3 are powered by two power assemblies respectively, allowing them to perform a lateral tilting action separately. However, this also brings some problems. Since the back support 2 and the leg support 3 have differences in manufacturing, and mounting differences when mounted on the bed frame 1, as well as non-uniform differences caused by component wear and error accumulation after long-term use, even if the back support 2 and the leg support 3 are lateral tilted at a same angle, their surfaces may still be uneven. The above is the prior art and will not be described in detail. Therefore, in the embodiment of the present invention, a leveling adjuster 6 is arranged at a connection position between the leg side-tilt 5 and the bed frame 1. When the leg support 3 and the back support 2 are lateral tilted or the patient is lying flat, if the leg support and the back support are uneven, the leg side-tilt 5 may be adjusted by the leveling adjuster 6 to move in a horizontal direction relative to the frame 1 (i.e., to move horizontally in a width direction of the bed frame 1), so that when the leg side-tilt 5 moves leftward, the height of a right side of the leg support 3 is lowered until it is flush with a right side of the back support 2, whereas when the leg side-tilt 5 moves rightward, the height of a left side of the leg support 3 is lowered until it is flush with a left side of the back support 2 (the left and right are referred to herein with reference to the left and right hands of the patient after the patient lies on the nursing bed for easy understanding), thus solving the above-mentioned problems.

The embodiment of the present invention has the beneficial effects that by arranging the leveling adjuster, when the back portion and the leg portion of the nursing bed are not even, the leg side-tilt 5 can be adjusted to move horizontally, the leg side-tilt 5 drives the leg support 3 to synchronously move, the position change, i.e., the change of the surface gradient, of the leg support 3 can be made according to the surface gradient of the back support 2, so that the back portion and the leg portion of the nursing bed can be at a same gradient.

Preferably, in a length direction of the bed frame 1, a part of the back support 2 close to the leg support 3 is hinged to the bed frame 1, and a back turning component is arranged between the bed frame 1 and the back support 2. Specifically, the back turning component drives the back support 2 to turn, which mainly used for switching the patient from a lying posture to a semi-recumbent posture, where the back side-tilt may be of a simple telescopic structure, such as an air cylinder, which belongs to the prior art, is not elaborated and is not shown in the drawings.

Preferably, during a turning stroke of the back turning component driving the back support 2, the leg side-tilt 5 can drive the leg support 3 to turn laterally. Specifically, in a process of the patient from the lying posture to the semi-recumbent posture, the back support 2 and the leg support 3 can still be tilted laterally, so that the patient can be in a side semi-recumbent posture, facilitating sputum excretion and treatment of some diseases for the patient.

At this point, preferably, the back support 2 includes a left back portion 20, a right back portion 21 and a middle back portion 22 in the width direction of the bed frame 1, the middle back portion connecting the left back portion 20 and the right back portion 21, and the back side-tilt 4 acts on the middle back portion 22. Specifically, the head, back and waist of the patient mainly lie on the middle back portion 22. With respect to left tilting of the middle back portion 22, some supporting structures may be disposed below the left back portion 20 to support the left side of the patient, and with respect to right tilting of the middle back portion 22, some supporting structures may be also disposed below the right back portion 21 to support the right side of the patient, i.e., a supporting rod may be hinged below a part of the right back portion 21 away from a right side of the middle back portion 22 and below a part of the left back portion 20 away from a left side of the middle back portion 22 respectively, during left side tilting, the supporting rod on the left back portion 20 is turned and may be connected to a left edge of the bed frame 1 in a plugging mode with a plugging size being made to ensure that the left back portion 20 can be substantially horizontal, and during right side tilting, the supporting rod on the right back portion 21 may also be connected to a right edge of the bed frame 1 in a plugging mode with a plugging size being made to ensure that the right back portion 21 can be substantially horizontal. As such, no matter which direction the middle back portion 22 turns toward, the patient is supported not only by the middle back portion 22, and therefore the patient can lie on the nursing bed stably to facilitate nursing treatment.

Preferably, the leg support 3 includes a left leg portion 30, a right leg portion 31 and a middle leg portion 30 in the width direction of the bed frame 1, the middle leg portion connecting the left leg portion 30 and the right leg portion 31, the leg side-tilt 5 acts on the middle leg portion 32, the left back portion 20 corresponds to the left leg portion 30, the right back portion 21 corresponds to the right leg portion 31, and the middle back portion 22 corresponds to the middle leg portion 32. Specifically, the hip, legs and feet of the patient are mainly supported by the middle leg portion 32. When the middle leg portion 32 is lateral tilted, some supporting structures may be disposed for both of the left leg portion 30 and the right leg portion 31, i.e., a supporting rod may be hinged below a part of the right leg portion 31 away from the right side of the middle leg portion 32 and below a part of the left leg portion 30 away from the left side of the middle leg portion 32 respectively, during left side tilting, the supporting rod on the left leg portion 30 is turned and may be connected to the left edge of the bed frame 1 in a plugging mode with a plugging size being made to ensure that the left leg portion 30 can be substantially horizontal, and during right side tilting, the supporting rod on the right leg portion 31 may also be connected to the right edge of the bed frame 1 in a plugging mode with a plugging size being made to ensure that the right leg portion 31 can be substantially horizontal, realizing auxiliary supporting for the patient in a side lying posture.

Preferably, the leg side-tilt 5 includes a lateral tilting motor 50. The lateral tilting motor 50 is a linear motor, one end, such as an output end, of the lateral tilting motor 50 is connected to a left side of the bed frame 1 through the leveling adjuster 6, an opposite end, such as a base end, of the lateral tilting motor 50 is hinged to a first swing arm 51, and one end of the first swing arm 51 is hinged to a right side of the bed frame 1 through a first supporting block 52; a second swing arm 53 is fixedly connected to the first swing arm 51, one end of the second swing arm 53 is hinged to a right side of the middle leg portion 32 through a first connecting rod 54, a second supporting block 55 is fixedly connected to a middle portion of the bed frame 1, and an upper end of the second supporting block 55 is hinged to a middle position of the middle leg portion 32; a left end of the middle leg portion 32 is hinged to a third swing arm 56, a right side of the left leg portion 30 is hinged to the third swing arm 56, and the third swing arm 56 is hinged to the second supporting block 55 through a second connecting rod 57; and a right end of the middle leg portion 32 is hinged to a fourth swing arm 58, a left side of the right leg portion 31 is hinged to the fourth swing arm 58, and the fourth swing arm 58 is hinged to the second supporting block 55 through a third connecting rod 59.

Specifically, when the patient is in a flat lying posture, an output shaft of the lateral tilting motor 50 extends by half, and at this point, the left leg portion 30, the middle leg portion 32, and the right leg portion 31 are all in a same horizontal plane, and an angle between the second swing arm 53 and the first connecting rod 54 is assumed to be 45° for easy understanding.

When a patient needs to be turned left, the output shaft of the lateral tilting motor 50 drives the first swing arm 51 connected therewith to deflect to the right with a hinge point between the first swing arm and the first supporting block 52 as a circle center in a process from half extension to complete extension, the second swing arm 53 fixedly connected with the first swing arm 51 then deflects to the right along with the first swing arm, and an angle between the second swing arm 53 and the first connecting rod 54 gradually increases from 45°. As such, a distance from a connection point between the second swing arm 53 and the first swing arm 51 to a connection point between the first connecting rod 54 and the right side of the middle leg portion 32 increases, the first connecting rod 54 and the second swing arm 53 then jointly exert an upward jacking effect on the right side of the middle leg portion 32, so that the right side of the middle leg portion 32 deflects upward about a connection point between the middle leg portion 32 and the second supporting block 55, until the output shaft of the lateral tilting motor 50 is completely extended, and thus the middle leg portion 32 is turned left to a desired angle, such as from 0° to 45°, which can be set according to actual needs.

In the process of left side tilting, the third swing arm 56 moves downward along with the left side of the middle leg portion 32, the fourth swing arm 58 moves upward along with the right side of the middle leg portion 32, and as such a connection point between the third swing arm 56 and the left side of the middle leg portion 32 is gradually close to the connection point between the second connecting rod 57 and the second supporting block 55, the angle between the third swing arm 56 and the second connecting rod 57 is then reduced. In this process, the left portion of the middle leg portion 32, the second connecting rod 57, the third swing arm 56 and the second supporting block 55 form a parallelogram-like structure, and thus when the third swing arm 56 moves downward, its position is basically the same as its initial position. Similarly, the fourth swing arm 58, the right portion of the middle leg portion 32, the third connecting rod 59 and the second supporting block 55 also form a parallelogram-like structure, when the fourth swing arm 58 moves upward, its position is basically the same as its initial position. The connection point between the fourth swing arm 58 and the right side of the middle leg portion 32 gradually moves away from the connection point between the third connecting rod 59 and the second supporting block 55. The angle between the fourth swing arm 58 and the third connecting rod 59 increases. After the patient is turned left, the third swing arm 56 and the second connecting rod 57 jointly support the left side of the middle leg portion 32 and the right side of the left leg portion 30.

When a patient needs to be laterally tilted right, the output shaft of the lateral tilting motor 50 drives the first swing arm 51 connected therewith to deflect to the left with a hinge point between the first swing arm and the first supporting block 52 as a circle center in a process from half extension back to no extension, the second swing arm 53 fixedly connected with the first swing arm 51 then deflects to the left along with the first swing arm, and an angle between the second swing arm 53 and the first connecting rod 54 gradually decreases from 45°. As such, the distance from the connection point between the second swing arm 53 and the first swing arm 51 to the connection point between the first connecting rod 54 and the right side of the middle leg portion 32 decreases, the first connecting rod 54 and the second swing arm 53 then jointly exert a downward pulling effect on the right side of the middle leg portion 32, so that the right side of the middle leg portion 32 deflects downward about the connection point between the middle leg portion 32 and the second supporting block 55, until the output shaft of the lateral tilting motor 50 is completely retracted, and thus the middle leg portion 32 is turned right to a desired angle, such as from 0° to −45°, which can be set according to actual needs.

In the process of right side tilting, the third swing arm 56 moves upward along with the left side of the middle leg portion 32, the fourth swing arm 58 moves downward along with the right side of the middle leg portion 32, and as such the connection point between the third swing arm 56 and the left side of the middle leg portion 32 is gradually away to the connection point between the second connecting rod 57 and the second supporting block 55, the angle between the third swing arm 56 and the second connecting rod 57 is then increased. In this process, the left portion of the middle leg portion 32, the second connecting rod 57, the third swing arm 56 and the second supporting block 55 form a parallelogram-like structure, and thus when the third swing arm 56 moves upward, its position is basically the same as its initial position. Similarly, the fourth swing arm 58, the right portion of the middle leg portion 32, the third connecting rod 59 and the second supporting block 55 also form a parallelogram-like structure, when the fourth swing arm 58 moves downward, its position is basically the same as its initial position. The connection point between the fourth swing arm 58 and the right side of the middle leg portion 32 is gradually close to the connection point between the third connecting rod 59 and the second supporting block 55. The angle between the fourth swing arm 58 and the third connecting rod 59 decreases. After the patient is turned right, the fourth swing arm 58 and the third connecting rod 59 jointly support the right side of the middle leg portion 32 and the left side of the right leg portion 31.

The structure and working principle of the back side-tilt 4 are the same as those of the leg side-tilt 5, and reference may be made to the above working process of the leg side-tilt 5 without elaborating again. The left, middle and right mentioned herein are based on the positions of the left and right hands of the patient lying on the nursing bed, so as to facilitate understanding of the working process of lateral tilting of the nursing bed, and the same applies to the left and right mentioned hereinafter.

Preferably, the leveling adjuster 6 comprises a bolt connection pair 60 screwed to the left side of the bed frame 1, the output end of the lateral tilting motor 50 is hinged to a lifting lug 61, and the bolt connection pair 60 rotates to enable the lifting lug 61 to move in a horizontal direction relative to the bed frame 1, that is, the bolt connection pair 60 and the lifting lug 61 do not transmit rotation but transmit axial movement. Structurally, the bolt connection pair and the lifting lug can rotate relative to each other through revolving body cooperation, eliminating rotation transmission; and a raised ring is used as a limiting mechanism to be arranged axially for position limiting, allowing transmission of axial movement. Specifically, the output shaft of the lateral tilting motor 50 cannot rotate, thus the lifting lug 61 connected therewith cannot rotate, however, the lifting lug 61 is hinged to the output shaft of the lateral tilting motor 50 in a manner the same as that between the first swing arm 51 and the lateral tilting motor 50, so that the output shaft of the lateral tilting motor 50 can swing. The bolt connection pair 60 is rotatably connected to the lifting lug 61, so that when the bolt connection pair 60 is rotated by external force, i.e. when the bolt connection pair is threaded on the bed frame 1, which can move horizontally left and right on the bed frame 1, namely the axial movement of the bolt, and then the lifting lug 61 is driven to move horizontally left and right, and so will the lateral tilting motor 50. As in the lateral tilting stroke of the middle leg portion 32, the left-right horizontal movement of the lateral tilting motor 50 causes the first connecting rod 54 to push upward or pull downward the right side of the middle leg portion 32 to adjust the position of the leg support 3, enabling its surface to be flush with the surface of the back support 2.

Preferably, a buffer 62 is hinged between the lifting lug 61 and the first swing arm 51. Specifically, the buffer 62 can assist the lateral tilting motor 50 to provide supporting force for the leg support 3; and in the event that the lateral tilting motor 50 fails, the leg support 3 suddenly moves downward, the buffer 62 can buffer this process to protect the patient. The buffer 62 may adopt a structure with a telescopic function. For example, a sleeve is sleeved on an outer wall of a solid rod and may slide in an axial direction of the solid rod, and a cylindrical spring is connected between an end of the solid rod away from the sleeve and an end of the sleeve away from the solid rod. In this way, when the solid rod and the sleeve move in opposite directions, the spring is stretched or compressed, which can just match the telescopic change of the lateral tilting motor 50 during working.

Preferably, the third swing arm 56 is provided with a first supporting surface 560, and during the side turning stroke of the middle leg portion 32, the first supporting surface 560 keeps the left leg portion 30 in a horizontal state all the time. Specifically, after the patient is turned left, the back and legs rest against the middle back portion 22 and the middle leg portion 32, and at this point, the middle back portion 22 and the middle leg portion 32 no longer provide the main vertical support for the patient, but rather the left leg portion 30 and the left back portion 20. Therefore, the first supporting surface 560 can keep the left leg portion 30 in a horizontal state all the time (the back side-tilt 4 is structurally the same as the leg side-tilt 5, and also has the same structure of the third swing arm 56, so the left back portion 20 also remains in a horizontal state all the time).

Preferably, the fourth swing arm 58 is provided with a second supporting surface 580, and during the side turning stroke of the middle leg portion 32, the second supporting surface 580) keeps the right leg portion 31 in a horizontal state all the time. Specifically, after the patient is turned right, the back and legs rest against the middle back portion 22 and the middle leg portion 32, and at this point, the middle back portion 22 and the middle leg portion 32 no longer provide the main vertical support for the patient, but rather the right leg portion 31 and the right back portion 21. Therefore, the second supporting surface 580) can keep the right leg portion 31 in a horizontal state all the time (the back side-tilt 4 is structurally the same as the leg side-tilt 5, and also has the same structure of the fourth swing arm 58, so the right back portion 21 also remains in a horizontal state all the time).

Figure 11:
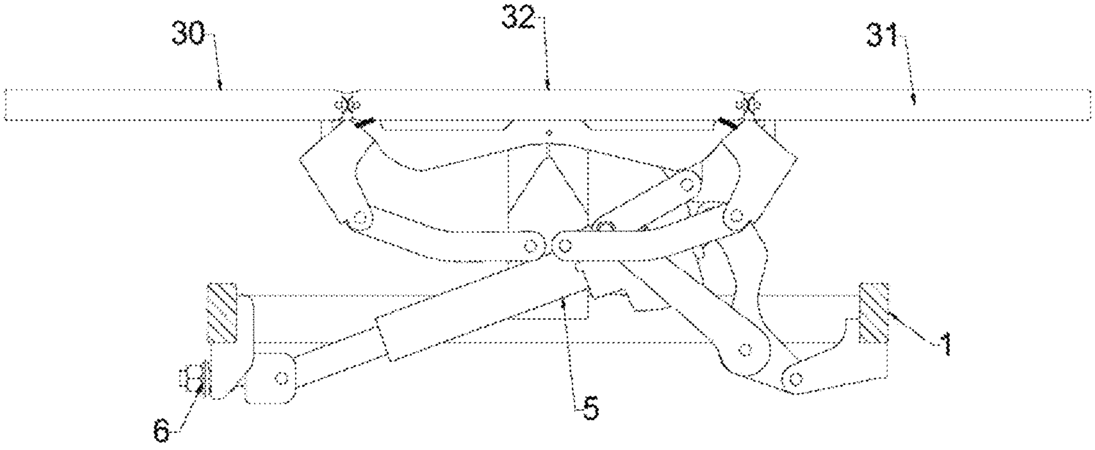
FIG. 11 is a simplified schematic view of a leg side-tilt in a horizontal state of a semi-recumbent position adjustable nursing bed with a large lateral tilting angle according to another embodiment of the present invention.
Figure 12:
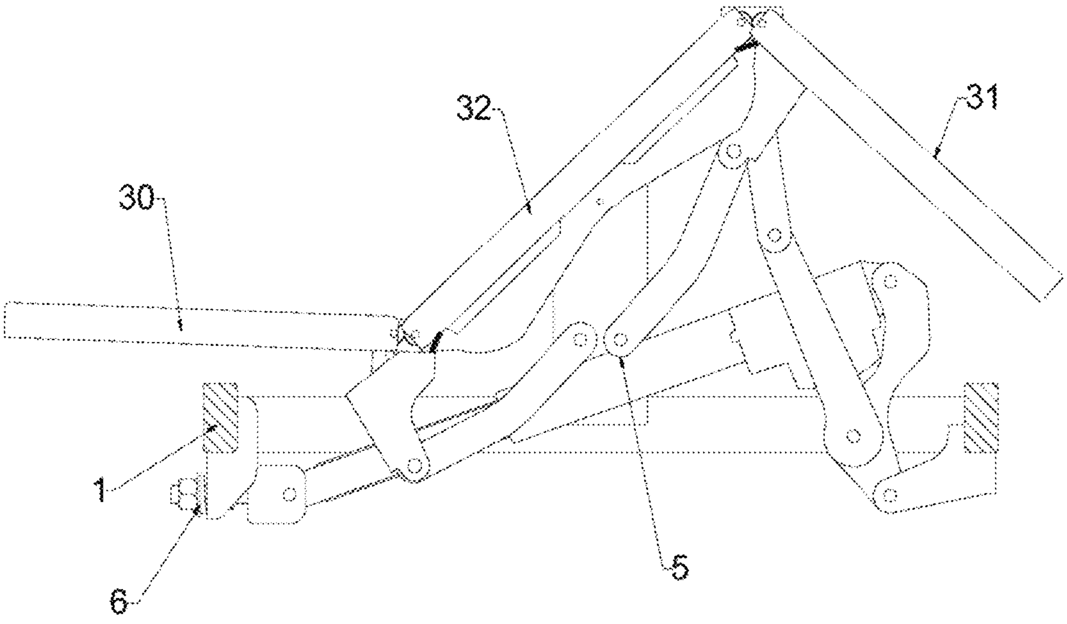
FIG. 12 is a simplified schematic view of the leg side-tilt in a left tilting state of the semi-recumbent position adjustable nursing bed with a large lateral tilting angle according to another embodiment of the present invention.
Figure 13:
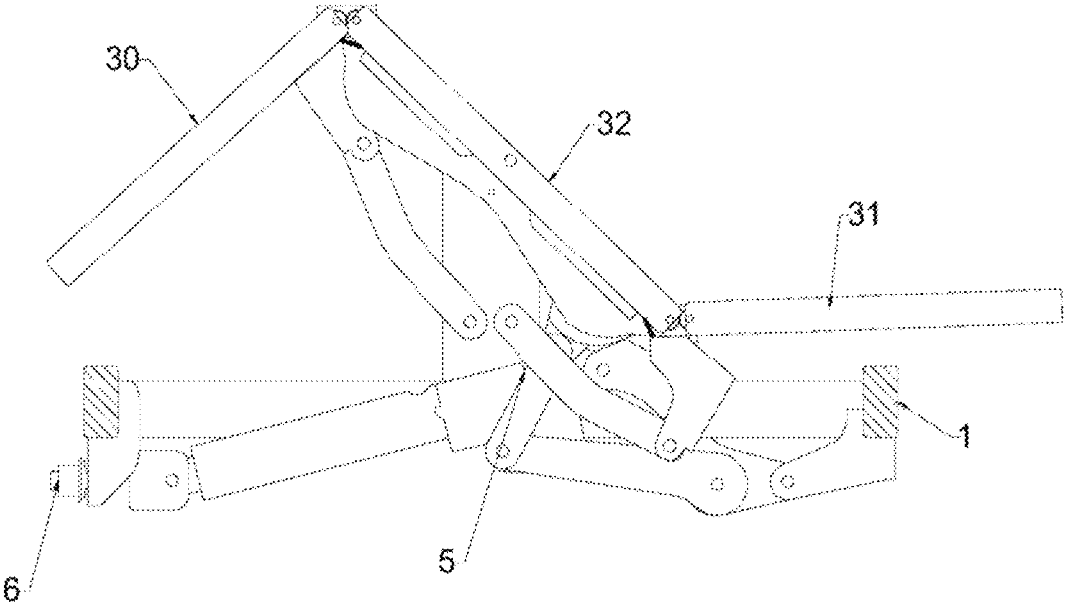
FIG. 13 is a simplified schematic view of the leg side-tilt in a right tilting state of the semi-recumbent position adjustable nursing bed with a large lateral tilting angle according to another embodiment of the present invention.
Figure 14:
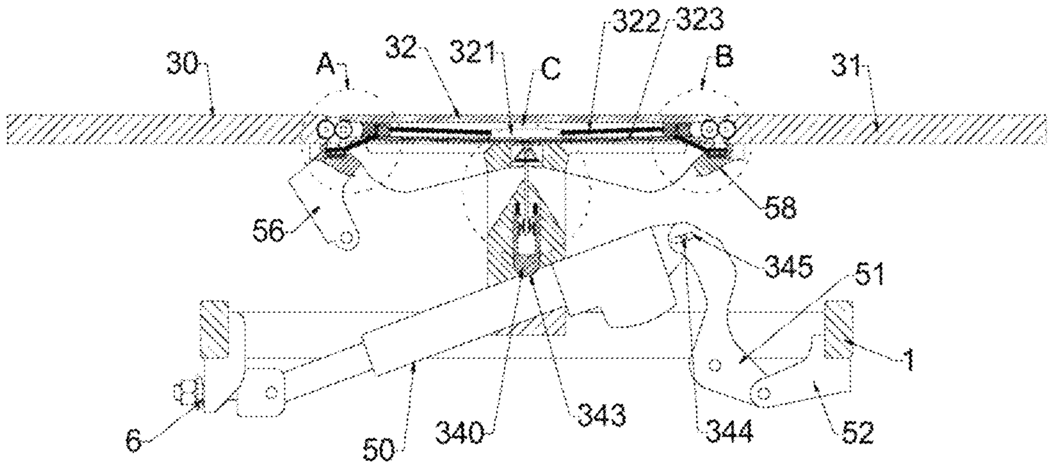
FIG. 14 is a schematic structural sectional view of FIG. 11.
Figure 15:
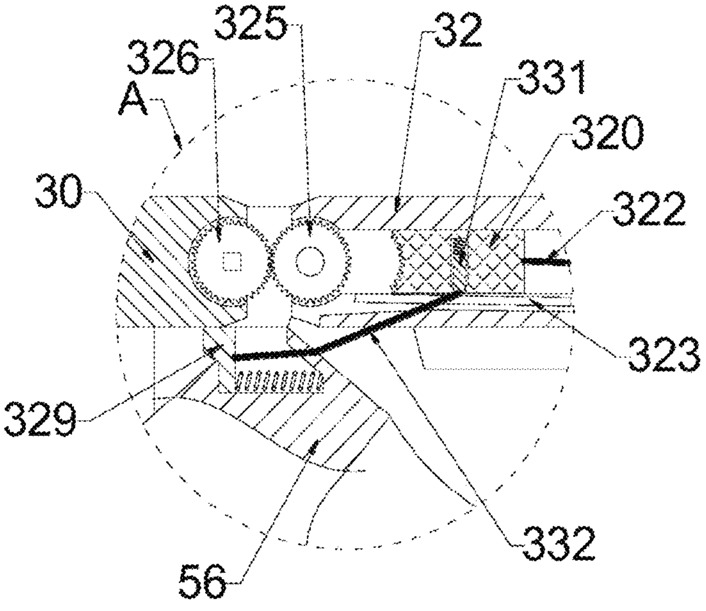
FIG. 15 is a schematic enlarged view of a part A in FIG. 14.
Figure 16:
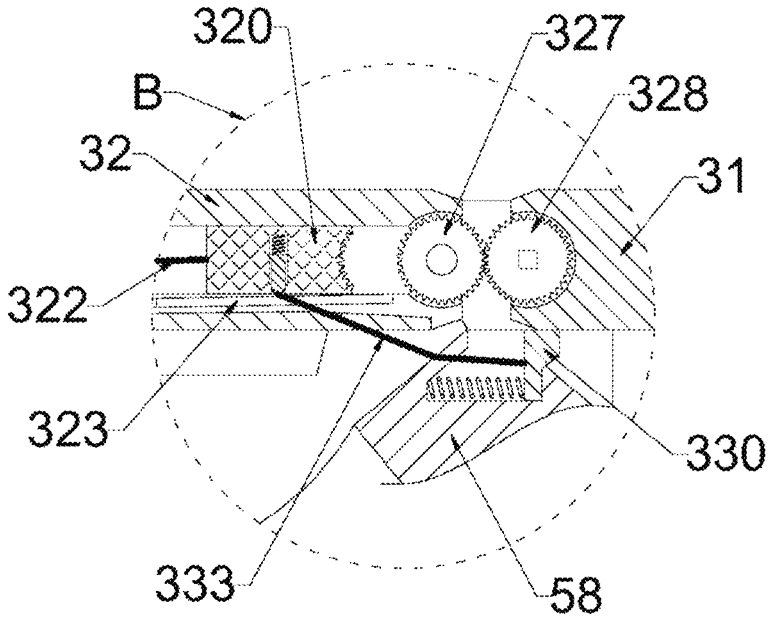
FIG. 16 is a schematic enlarged view of a part B in FIG. 14.
Figure 17:
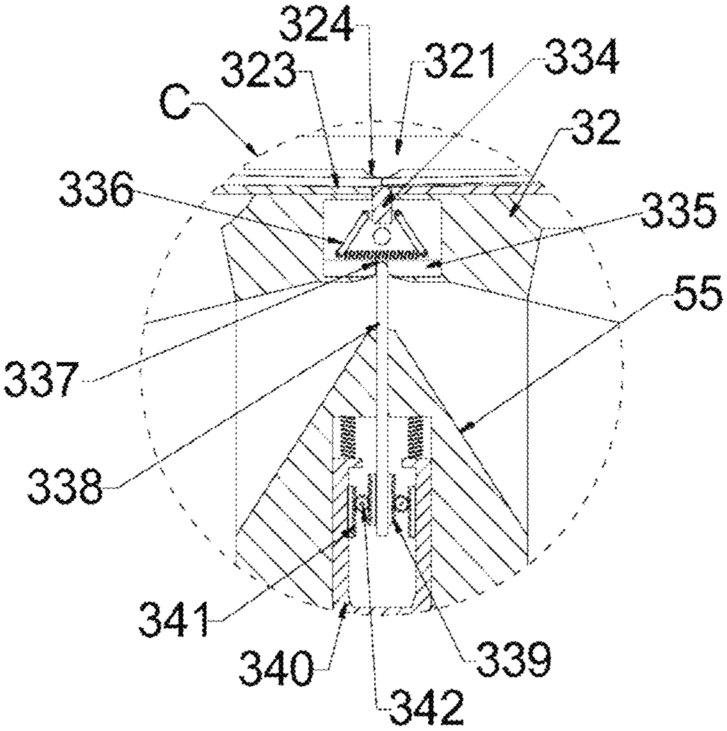
FIG. 17 is a schematic enlarged view of a part C in FIG. 14.

As shown in FIGS. 11-17, in another embodiment of the present invention, a cavity is formed in the middle leg portion 32, a toothed block 320 is slidably arranged at each of a left end and a right end of the cavity, a counterweight 321 is further arranged in the middle of the cavity, the two toothed blocks 320 are each connected to the counterweight 321 through a elastic rope 322, and two tilting boards 323 are arranged in the cavity, each corresponding to the respective toothed block 320.

A center point of the tilting board 323 is hinged to the middle leg portion 32, a hinge point being provided with a first elastic member, an elastic force of the first elastic member allows an end of the tilting board 323 close to the center of the cavity to always have a downward deflection trend, a limiting groove 324 is formed at a bottom of the center of the cavity, and when the counterweight 321 is located at the center of the cavity, an end of the tilting board 323 close to the center of the cavity abuts against the bottom of the center of the cavity under the elastic force of the first elastic member, so that a protrusion on the counterweight 321 is plugged to the limiting groove 324.

A first gear 32 is rotatably arranged on a left side of the middle leg portion 32, a second gear 326 is fixedly connected to a right side of the left leg portion 30, the first gear 325 is meshed with the second gear 326, a third gear 327 is rotatably arranged on the right side of the middle leg portion 32, a fourth gear 328 is fixedly connected to the left side of the right leg portion 31, the third gear 327 is meshed with the fourth gear 328, and when the counterweight 321 is plugged to the limiting groove 324, the two toothed blocks 320 are away from the first gear 325 and the third gear 327 respectively.

A third supporting block 329 is slidably arranged on the third swing arm 56, a second elastic member is connected between the third swing arm 56 and the third supporting block 329 in a sliding direction of the third supporting block, a fourth supporting block 330 is slidably arranged on the fourth swing arm 58, a third elastic member is connected between the fourth swing arm 58 and the fourth supporting block 330 in a sliding direction of the fourth supporting block, when the left side of the middle leg portion 32 swings downward, the third supporting block 329 supports the right side of the left leg portion 30, and when the right side of the middle leg portion 32 swings downward, the fourth supporting block 330 supports the left side of the right leg portion 31.

A fifth supporting block 331 is slidably arranged on the toothed block 320, the fifth supporting block 331 is in sliding contact with the tilting board 323, a fourth elastic member is connected between the toothed block 320 and the fifth supporting block 331 in a sliding direction of the fifth supporting block, a first non-elastic rope 332 is connected between the third supporting block 329 and the adjacent respective fifth supporting block 331, a second non-elastic rope 333 is connected between the fourth supporting block 330 and the adjacent respective fifth supporting block 331, a stiffness coefficient of the fourth elastic member is smaller than a stiffness coefficient of the second elastic member, a stiffness coefficient of the fourth elastic member is smaller than a stiffness coefficient of the third elastic member, and the stiffness coefficient of the second elastic member and the stiffness coefficient of the third elastic member are both smaller than a stiffness coefficient of the elastic rope 322.

Specifically, when the middle leg portion 32 deflects to the left, since the counterweight 321 is plugged to the limiting groove 324, the counterweight 321 will not slide along an inclined direction of the cavity. However, in this process, the toothed block 320 near the left leg portion 30 is limited by the tensile force of the elastic rope 322 between the toothed block and the counterweight 321, so that the toothed block 320 will not slide along with the inclination of the cavity at this point. The stiffness coefficient of the second elastic member and the stiffness coefficient of the third elastic member are both smaller than the stiffness coefficient of the elastic rope 322, the stiffness coefficient of the fourth elastic member is smaller than the stiffness coefficient of the second elastic member, the stiffness coefficient of the fourth elastic member is smaller than the stiffness coefficient of the third elastic member, and the first non-elastic rope 332 is connected between the fifth supporting block 331 and the third supporting block 329 on the toothed block 320 at the left side of the middle leg portion 32, so that the middle leg portion 32 deflects to drive the toothed block 320 and the fifth supporting block 331 to deflect together, and then the distance between the fifth supporting block 329 and the third supporting block is increased, the fifth supporting block 331 is inevitably about to slide out from the toothed block 320, so that the fifth supporting block 331 presses the tilting board 32, and the elastic force of the fourth elastic member increases, so that an end of the tilting board 323 close to the center of the cavity tilts upward about a connection point between the tilting board and the cavity, so that the tilting board 323 will drive the counterweight 321 to be disengaged from the limiting groove 324, when the weight block 321 is completely disengaged from the limiting groove 324, it will gradually approach a position close to the right side of the left leg portion 30 along a tilting direction of the tilting board 323, the toothed block 320 close to the right side of the left leg portion 30 will approach the first gear 325 under the pulling force of the first non-elastic rope 332, after the counterweight 321 contacts the toothed block 320, the toothed block 320 will be pushed to gradually approach the first gear 325 until the toothed block 320 contacts the first gear 325, and then the first gear 325 will be stuck by the toothed block 320. In this stroke, the movement of the counterweight 321 is further affected by the elastic force of another elastic rope 322 located at the right part of the middle leg portion 32, so that the movement speed of the counterweight 321 is relatively slow. If the middle leg portion 32 needs to be turned 45° to the left, the counterweight 321 pushes the toothed block 320 to lock the first gear 325 when the middle leg portion 32 is turned 35° to the left, then in the remaining 10° stroke to be turned, the first gear 325 deflects along with the middle leg portion 32, the second gear 326 meshed with the first gear 325 drives the left leg portion 30 to deflect in a direction opposite to the turning direction of the middle leg portion 32, that is, the angle between the middle leg portion 32 and the left leg portion 30 becomes smaller, after the middle leg portion 32 is turned 45° to the left, a left end of the left leg portion 30 slightly tilts up, and at this point, the first gear 325 and the second gear 326 are locked, and the third supporting block 329 still supports the left leg portion 30.

During the left tilting process of the middle leg portion 32, when the counterweight 321 moves toward the left leg portion 30, the toothed block 320 on the right side of the counterweight is pulled to gradually move away from the third gear 327 via the elastic rope 322. In this way, the toothed block 320 will pull the fourth supporting block 330 via the second non-elastic rope 333 to be gradually out of supporting the left side of the right leg portion 31, and compress the third elastic member. As a result, the third gear 327 is not limited, the right leg portion 31 is not supported, and the right leg portion will then deflect about the connection point between the right leg portion and the fourth swing arm 58, that is, the right side of the right leg portion 31 swings downward, and the downward swinging angle of the right leg portion 31 is much larger than the upward swinging angle of the left leg portion 30.

In the process that the middle leg portion 32 turns back to the horizontal position from the left side, as the middle leg portion 32 gradually turn backs, the elastic force of the fourth elastic member is released, so that the fifth supporting block 331 will be pulled to gradually return to its initial position. The fifth supporting block 331 will give a pulling force to the third supporting block 329 via the first non-elastic rope 332. The third supporting block 329 under the elastic force of the second elastic member pulls the whole of the toothed block 320 and the fifth supporting block 331 via the first inelastic rope 332 to gradually move away from the first gear 325. Before the first gear 325 and the second gear 326 are completely disengaged, the left leg portion 30 will gradually turns back from a slightly upward tilting position to its initial position. When the toothed block 320 and the first gear 325 are completely disengaged, the middle leg portion 32 reaches a horizontal position, so that the fifth supporting block 331 is completely reset and no longer compress the tilting board 323. Under the resilience of the first elastic member, an end of the tilting board 323 close to the center of the cavity swings downward back to its initial position, the counterweight 321 then returns to the center of the cavity along the tilting direction of the tilting board 323 and is plugged to the limiting groove 324.

In the process that the counterweight 321 returns to its initial position, the fourth supporting block 330 gradually resets under the resilience of the third elastic member, and then it will pull the whole of the fifth supporting block 331 and the toothed block 320) to move toward a direction approaching the third gear 327 through the second non-elastic rope 333, and the resetting of the fourth supporting block 330 will be obstructed by the left side of the right leg portion 31 swinging downward, so that the right side of the right leg portion 31 can be pushed up to a horizontal position with manual intervention, and then the fourth supporting block 330 may return to its initial position to support the left side of the right leg portion 31.

In the above embodiment, there may be jamming in movement between the toothed block 320 and the fifth supporting block 331. To reduce the jamming, a rolling structure such as a ball may be arranged on the sliding surface, or a sliding groove may be arranged in an inclined shape and the like, or a combination thereof, etc.

The above is the working processes of left-side tilting and resetting from left-side tilting of the middle leg portion 32. Processes of right-side tilting and resetting from right-side tilting of the middle leg portion 32 are opposite to the above working processes. The back support 2 is provided with the same structure with the same working principle, which will not be further described herein and not shown in the drawings.

The embodiment of the present invention has the following beneficial effects: firstly, after the middle leg portion 32 lateral tilts, the upward tilting of the left leg portion 30 or the right leg portion 31 can play a certain blocking role so as to prevent the patient from tilting excessively or even falling off the nursing bed due to the lateral tilting force applied to the patient by lateral tilting of the middle leg portion 32:

secondly, after the middle leg portion 32 lateral tilts, downward swinging of the left leg portion 30 or the right leg portion 31 enable the width of the nursing bed to be temporarily reduced, so that a doctor can conveniently carry out nursing treatment from the back of the patient; and thirdly, after the middle leg portion 32 lateral tilts, the first gear 325 and the second gear 326 are locked or the third gear 327 and the fourth gear 328 are locked, so as to support the left leg portion 30 or the right leg portion 31, while the third supporting block 329 can support the left leg portion 30 or the fourth supporting block 330 can support the right leg portion 31, ensuring that the patient can lie on the nursing bed stably after lateral tilting.

In another embodiment of the present invention, as shown in FIGS. 11 to 17, a sixth supporting block 334 is vertically slidably arranged on the middle leg portion 32 at a position of the limiting groove 324. Two seventh supporting blocks 335 are horizontally slidably arranged below the sixth supporting block 334. The sixth supporting block 334 is hinged to each of the seventh supporting blocks 335 through a fourth connecting rod 336, the two fourth connecting rods 336 are arranged in a splayed configuration. A fifth elastic member is connected between the two fourth connecting rods 336. A locking hole 337 is formed in the middle leg portion 32 at a position directly below the sixth supporting block 334. Closing and opening of the locking hole 337 is controlled by engaging and disengaging between the two seventh supporting blocks 335.

A locking rod 338 is vertically slidably arranged on the second supporting block 55. The locking hole 337 is movably plugged with the locking rod 338. A reciprocating member is arranged in the second supporting block 55, and controls plugging between the locking rod 338 and the locking hole 337 based on the power of the lateral tilting motor 50.

The reciprocating member includes a first gear rack 339 arranged on the locking rod 338. A trigger block 340 is vertically slidably arranged on the second supporting block 55. A sixth elastic member is connected between the second supporting block 55 and the trigger block 340 in a moving direction of the trigger block. A second gear rack 341 is mounted on the trigger block 340, teeth of the first gear rack 339 and teeth of the second gear rack 341 are arranged opposite to each other. A fifth gear 342 is rotatably arranged on the second supporting block 55. The first gear rack 339 is meshed with the fifth gear 342, and the second gear rack 341 is meshed with the fifth gear 342. A notch 343 is arranged on the lateral tilting motor 50, the trigger block 340 movably contact with the notch 343. A strip groove 345 is arranged at a hinged position between the first swing arm 51 and the lateral tilting motor 50, and a hinge shaft 344 of the first swing arm and the lateral tilting motor is slidably arranged in the strip groove 345.

Specifically, when the middle leg portion 32 is in a horizontal state, under the pressing action of two tilting rods, the sixth supporting block 334 moves downward in the limiting groove 324, the sixth supporting block 334 creates thrust on the two seventh supporting blocks 335 through the two fourth connecting rods 336 arranged in the splayed configuration, so that the two seventh supporting blocks 335 are in a separated state, the locking hole 337 is opened. The lower end of the trigger block 340 is plugged into the notch 343 under the elastic force of the sixth elastic member, and thus the second gear rack 341 has a downward moving trend, and under the action of the fifth gear 342, the first gear rack 339 has an upward trend. The first gear rack 339 drives the locking rod 338 to be inserted into the locking hole 337, so that the side turning action of the middle leg portion 32 cannot be carried out, that is, the middle leg portion 32 is locked in a horizontal state at this point, and the lateral tilting motor 50 and the hinge shaft 344 of the first swing arm 51 are in the central position of the strip groove 345. The patient is lying flat on the middle leg portion 32 at this point, supported primarily by the second supporting block 55.

When the middle leg portion 32 needs to deflect, the output shaft of the lateral tilting motor 50, whether extended or retracted, will squeeze the lower end of the trigger block 340. When the hinge shaft 344 moves from the middle of the strip groove 345 to one end thereof, the side turning of the middle leg portion 32 is limited because the locking rod 338 is inserted into the locking hole 337. Therefore, in this process, the trigger block 340 is released from the notch 343, the trigger block 340 will move upward. The second gear rack 341 drives the second gear 326 to rotate, so that the first gear rack 339 moves downward to drive the locking rod 338 to be drawn away from the locking hole 337. After the counterweight 321 moves away from the center of the cavity, the tilting board 323 loses the downward pressure on the sixth supporting block 334, the angle between the two fourth connecting rods 336 under the resilience of the fifth elastic member decreases, creating upward thrust on the sixth supporting block 334, and meanwhile pulling the two seventh supporting blocks 335 to approach each other so as to close the locking hole 337. The lateral tilting motor 50 then continues to operate, and lateral tilting of the middle leg portion 32 is not limited.

The same structure is also arranged on the back support 2, the working principle is the same. It will not be elaborated herein and not shown in the drawings.

The embodiments of the invention have the following beneficial effects: firstly, the plugging between the locking rod 338 and the locking hole 337 provides locking of the middle leg portion 32 in a horizontal position, ensuring the stability of the patient lying flat on the nursing bed; and secondly, each time the middle leg portion 32 returns to the horizontal position, a horizontal calibration is accordingly completed, allowing the upper surface of the leg support 3 to be flush with the upper surface of the back support 2.

The above only describes certain exemplary embodiments of the present invention through explanation. It will be apparent to those of ordinary skill in the art that the described embodiments may be modified in various different ways without departing from the spirit and scope of the present invention. Accordingly, the above drawings and description are illustrative in nature and should not be construed as limiting the scope of the present invention.

What is claimed is:

1. A semi-recumbent position adjustable nursing bed with a large lateral tilting angle, comprising a bed frame, a back support and a leg support, the back support and the leg support being arranged on the bed frame, a back side-tilt for lateral tilting of the back support being arranged on the bed frame, a leg side-tilt for lateral tilting of the leg support being further arranged on the bed frame, wherein the semi-recumbent position adjustable nursing bed with a large lateral tilting angle further comprises a leveling adjuster;

the leveling adjuster is arranged between the bed frame and the leg side-tilt, the leveling adjuster enabling the leg side-tilt to move in a horizontal direction relative to the bed frame;

the back support comprises a left back portion, a right back portion and a middle back portion in a width direction of the bed frame, the middle back portion connecting the left back portion and the right back portion, and the back side-tilt acts on the middle back portion;

the leg support comprises a left leg portion, a right leg portion and a middle leg portion in the width direction of the bed frame, the middle leg portion connecting the left leg portion and the right leg portion, the leg side-tilt acts on the middle leg portion, the left back portion corresponds to the left leg portion, the right back portion corresponds to the right leg portion, and the middle back portion corresponds to the middle leg portion;

the leg side-tilt comprises a lateral tilting motor, an output end of the lateral tilting motor is connected to a left side of the bed frame through the leveling adjuster, an opposite end of the lateral tilting motor is hinged to a first swing arm, and one end of the first swing arm is hinged to a right side of the bed frame through a first supporting block; a second swing arm is fixedly connected to the first swing arm, one end of the second swing arm is hinged to a right side of the middle leg portion through a first connecting rod, a second supporting block is fixedly connected to a middle portion of the bed frame, and an upper end of the second supporting block is hinged to a middle position of the middle leg portion; a left end of the middle leg portion is hinged to a third swing arm, a right side of the left leg portion is hinged to the third swing arm, and the third swing arm is hinged to the second supporting block through a second connecting rod; and a right end of the middle leg portion is hinged to a fourth swing arm, a left side of the right leg portion is hinged to the fourth swing arm, and the fourth swing arm is hinged to the second supporting block through a third connecting rod;

a cavity is formed in the middle leg portion, two toothed blocks are slidably arranged at a left end and a right end of the cavity, respectively, a counterweight is further arranged in the middle of the cavity, each of the two toothed blocks is connected to the counterweight through a elastic rope, two tilting boards are arranged in the cavity, each corresponding to a respective one of the two toothed blocks;

a center point of each of the two tilting boards is hinged to the middle leg portion, a hinge point being provided with a first elastic member, an elastic force of the first elastic member allows an end of each of the two tilting boards close to the center of the cavity to always have a downward deflection trend, a limiting groove is formed at a bottom of the center of the cavity, and when the counterweight is located at the center of the cavity, an end of each of the two tilting boards close to the center of the cavity abuts against the bottom of the center of the cavity under the elastic force of the first elastic member, so that a protrusion on the counterweight is plugged to the limiting groove;

a first gear is rotatably arranged on a left side of the middle leg portion, a second gear is fixedly connected to a right side of the left leg portion, the first gear is meshed with the second gear, a third gear is rotatably arranged on the right side of the middle leg portion, a fourth gear is fixedly connected to the left side of the right leg portion, the third gear is meshed with the fourth gear, and when the counterweight is plugged to the limiting groove, the two toothed blocks are away from the first gear and the third gear respectively;

a third supporting block is slidably arranged on the third swing arm, a second elastic member is connected between the third swing arm and the third supporting block in a sliding direction of the third supporting block, a fourth supporting block is slidably arranged on the fourth swing arm, a third elastic member is connected between the fourth swing arm and the fourth supporting block in a sliding direction of the fourth supporting block, when the left side of the middle leg portion swings downward, the third supporting block supports the right side of the left leg portion, and when the right side of the middle leg portion swings downward, the fourth supporting block supports the left side of the right leg portion; and a fifth supporting block is slidably arranged on each of the two toothed blocks, the fifth supporting block is in sliding contact with a respective one of the two tilting boards, a fourth elastic member is connected between the fifth supporting block and a respective one of the two toothed blocks in a sliding direction of the fifth supporting block, a first non-elastic rope is connected between the third supporting block and the adjacent respective fifth supporting block, a second non-elastic rope is connected between the fourth supporting block and the adjacent respective fifth supporting block, a stiffness coefficient of the fourth elastic member is smaller than a stiffness coefficient of the second elastic member, a stiffness coefficient of the fourth elastic member is smaller than a stiffness coefficient of the third elastic member, and the stiffness coefficient of the second elastic member and the stiffness coefficient of the third elastic member are both smaller than a stiffness coefficient of the elastic rope.

2. The semi-recumbent position adjustable nursing bed with a large lateral tilting angle according to claim 1, wherein a part of the back support portion near the leg support portion in a length direction of the bed frame is hinged to the bed frame, and a back turning component is arranged between the bed frame and the back support.

3. The semi-recumbent position adjustable nursing bed with a large lateral tilting angle according to claim 2, wherein during a turning stroke of the back support driven by the back turning component, the back side-tilt can also drive the back support to lateral tilt, and the leg side-tilt can also drive the leg support to lateral tilt.

4. The semi-recumbent position adjustable nursing bed with a large lateral tilting angle according to claim 1, wherein the leveling adjuster comprises a bolt connection pair screwed to the left side of the bed frame, the output end of the lateral tilting motor is hinged to a lifting lug, and the bolt connection pair rotates to enable the lifting lug to move in a horizontal direction relative to the bed frame.

5. The semi-recumbent position adjustable nursing bed with a large lateral tilting angle according to claim 4, wherein a buffer is hinged between the lifting lug and the first swing arm.

6. The semi-recumbent position adjustable nursing bed with a large lateral tilting angle according to claim 1, wherein a first supporting surface is arranged on the third swing arm and the left leg portion is kept in a horizontal state by the first supporting surface during a lateral tilting stroke of the middle leg portion.

7. The semi-recumbent position adjustable nursing bed with a large lateral tilting angle according to claim 1, wherein a second supporting surface is arranged on the fourth swing arm and the right leg portion is kept in a horizontal state by the second supporting surface during the lateral tilting stroke of the middle leg portion.

* * * * *